(12) United States Patent
Zywiak et al.

(10) Patent No.: US 10,267,325 B2
(45) Date of Patent: Apr. 23, 2019

(54) AIR CYCLE MACHINE SPEED DIAGNOSTIC

(71) Applicant: Hamilton Sundstrand Corporation, Windsor Locks, CT (US)

(72) Inventors: Thomas M. Zywiak, Suffield, CT (US); John M. Beck, Windsor, CT (US); Peter Zywiak, Suffield, CT (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 530 days.

(21) Appl. No.: 14/563,589

(22) Filed: Dec. 8, 2014

(65) Prior Publication Data
US 2016/0160866 A1     Jun. 9, 2016

(51) Int. Cl.
| | | |
|---|---|---|
| *F04D 27/00* | (2006.01) | |
| *G05D 7/06* | (2006.01) | |
| *F04D 19/00* | (2006.01) | |
| *B64D 13/06* | (2006.01) | |
| *F25B 49/00* | (2006.01) | |
| *B64F 5/60* | (2017.01) | |

(52) U.S. Cl.
CPC .......... *F04D 27/004* (2013.01); *B64D 13/06* (2013.01); *B64F 5/60* (2017.01); *F04D 19/002* (2013.01); *F25B 49/005* (2013.01); *G05D 7/0629* (2013.01)

(58) Field of Classification Search
CPC ........ F04D 27/004; F04D 19/002; B64F 5/60; B64D 13/06; G01M 13/04; G01M 15/046; G05D 7/0629
See application file for complete search history.

(56) References Cited

U.S. PATENT DOCUMENTS

| | | | |
|---|---|---|---|
| 6,176,074 B1* | 1/2001 | Thompson | F01D 21/045 60/39.091 |
| 2012/0107094 A1* | 5/2012 | Lillis | F01D 17/06 415/118 |
| 2013/0319092 A1* | 12/2013 | Rowe | F01D 21/003 73/112.01 |
| 2015/0211581 A1* | 7/2015 | Murphy | G01H 1/003 340/682 |

FOREIGN PATENT DOCUMENTS

EP     2615031 A1     7/2013

OTHER PUBLICATIONS

Extended European Search Report of the European Patent Office for International Application No. 15198389.7-1754, dated May 18, 2016, 7 pages.
EP Communication Pursuant to Article 94(3) EPC; Application No. 15 198 389.7-1754; dated May 26, 2017; pp. 1-5.

* cited by examiner

Primary Examiner — Carlos A Rivera
Assistant Examiner — Adam W Brown
(74) Attorney, Agent, or Firm — Cantor Colburn LLP

(57) ABSTRACT

A method and apparatus for operating an air cycle machine is disclosed. The apparatus includes a detector for measuring a rotational speed of a component of the air cycle machine. A processor estimates a rate of change of rotational speed of the component from the measured rotational speed and shuts down the air cycle machine when the estimated rate of change of the rotational speed of the component is greater than a selected rate threshold.

9 Claims, 4 Drawing Sheets

AIR CYCLE MACHINE SPEED DIAGNOSTIC

BACKGROUND OF THE INVENTION

Air cycle machines are often used in aircraft systems, such as in aircraft air conditioning systems, aircraft pressurization systems, etc. An air cycle machine includes an air bearing that uses a film of pressurized air to provide a low-friction load-bearing interface between two surfaces. At least one of the two surfaces may be rotating at high speed. The pressurized air prevents the two surfaces from touching each other thereby allowing the rotating surface to rotate freely. However, when an air bearing becomes overloaded, the surfaces can touch, leading to abnormal speed fluctuations of the rotating surface. Failure of the air bearing can lead to substantially constant contact between the two surfaces, which can cause materials from the surfaces to rub off and be emitted into the air. Such air emissions can be transmitted into a cabin of the airplane, requiring the aircraft to land. Thus, there is a need to be able to monitor the air cycle machine in order to be able to shut down the air cycle machine before such an event occurs.

BRIEF DESCRIPTION OF THE INVENTION

According to one aspect of the invention, a method of operating an air cycle machine includes: measuring a rotational speed of a component of the air cycle machine; estimating a rate of change of the rotational speed of the component; comparing the rate of change of the rotational speed to a selected rate threshold; and shutting down the air cycle machine when the rate of change of the rotational speed is greater than the selected rate threshold.

According to another aspect of the invention, an apparatus for operating an air cycle machine includes: a detector configured to measure a rotational speed of a component of the air cycle machine; and a processor configured to estimate a rate of change of rotational speed of the component from the measured rotational speed, and shut down the air cycle machine when the estimated rate of change of the rotational speed of the component is greater than a selected rate threshold.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
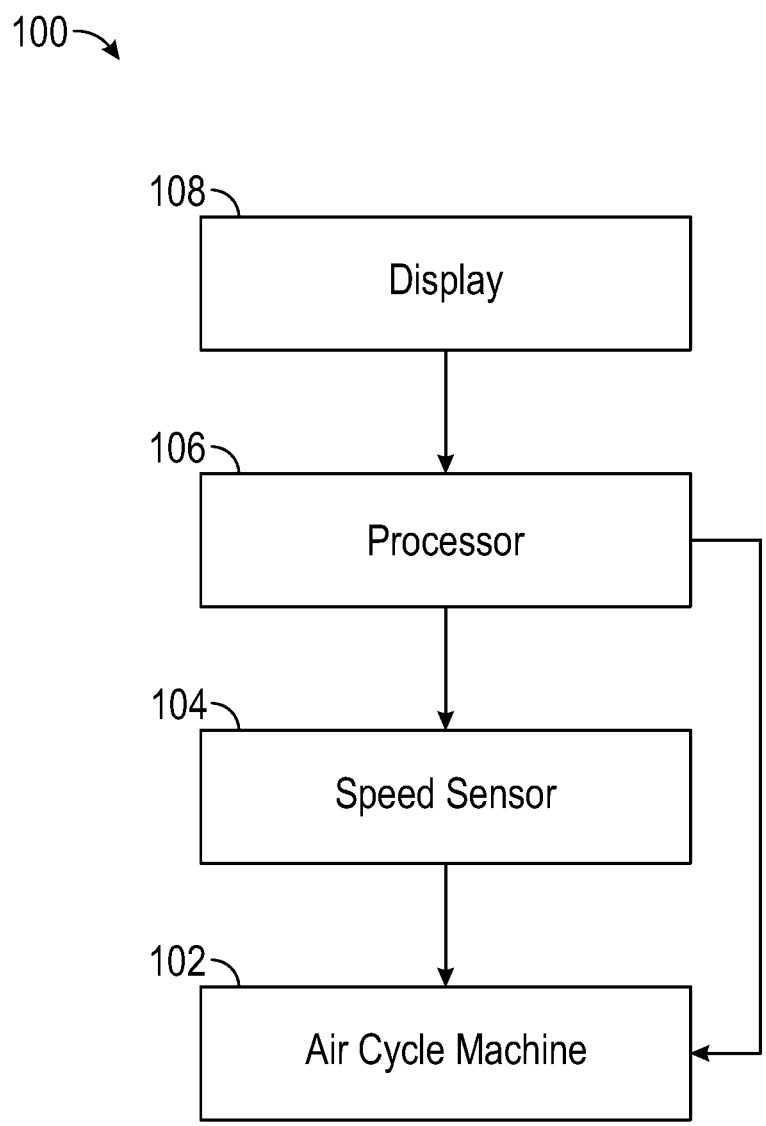
FIG. 1 shows a schematic diagram of a system for operating an air cycle machine in one embodiment.

FIG. 1 shows a schematic diagram of a system 100 for operating an air cycle machine 102 in one embodiment. The air cycle machine 102 includes at least one rotating part allowed to rotate via an air bearing. A speed sensor 104 measures a rotational speed of the air cycle machine 102, i.e., a rotational speed of the at least one rotating part or component. In one embodiment, the speed sensor 104 measures the rotational speed at a rate of about 20 times per second (20 Hertz). A processor 106 receives the measurements of the rotational speed and estimates or calculates a rate of change of the rotational speed from the received measurements. The rate of change of the rotational speed may be an acceleration or a deceleration of the at least one rotating part. In one embodiment, the calculated rate of change of the rotational speed is compared to a selected rate threshold. When the calculated rate of change of the rotational speed is greater than the selected rate threshold, the processor 106 may shut down or turn off the air cycle machine 102 in order to prevent further wear to the air cycle machine 102. The processor may provide a message at display 108 indicate that the air cycle machine 108 has been shut down. In various embodiments, the rate of change of the rotational speed is a deceleration of the component, and comparing the deceleration to the selected rate threshold refers to comparing a magnitude of the deceleration to a magnitude of the selected rate threshold. In one embodiment, the selected rate threshold may be about 1000 rpm/sec.

Figure 2:
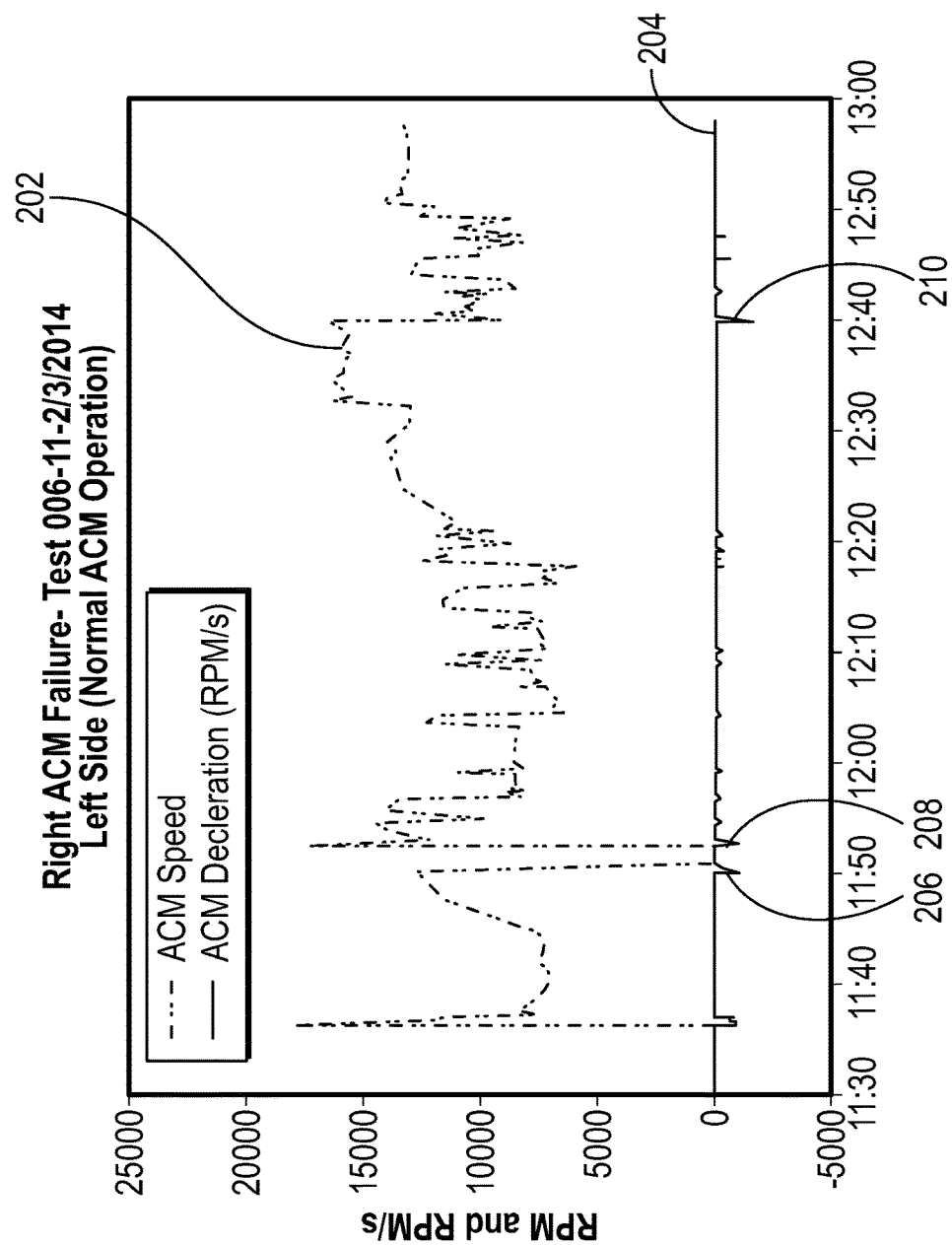
FIG. 2 shows speeds and deceleration rates for a rotating component of a properly operating air cycle machine that is not expected to experience a failure in a near future.

FIG. 2 shows speeds and deceleration rates for a rotating component of a properly operating air cycle machine 102 that is not expected to experience a failure in a near future. The component speed is indicated by speed curve 202 and is in units of revolutions per minute (rpm). The rate of change of the rotational rate of the component is indicated by acceleration curve 204 and is in units or revolutions per minute per second (rpm/sec). Time is shown along the abscissa. The speed curve 202 shows normal (i.e., non-erratic) variation consistent with proper operation of the air cycle machine 102. The acceleration curve 204 shows that the acceleration/deceleration of the component is generally small, i.e., less than the selected rate threshold. In a few instances, the acceleration curve 204 exhibits spikes, as shown at spikes 206, 208 and 210, for example. The spikes face downward, indicating a deceleration of the component. Acceleration is present in operation of the air cycle machine 102 but is not shown in FIG. 2.

Figure 3:
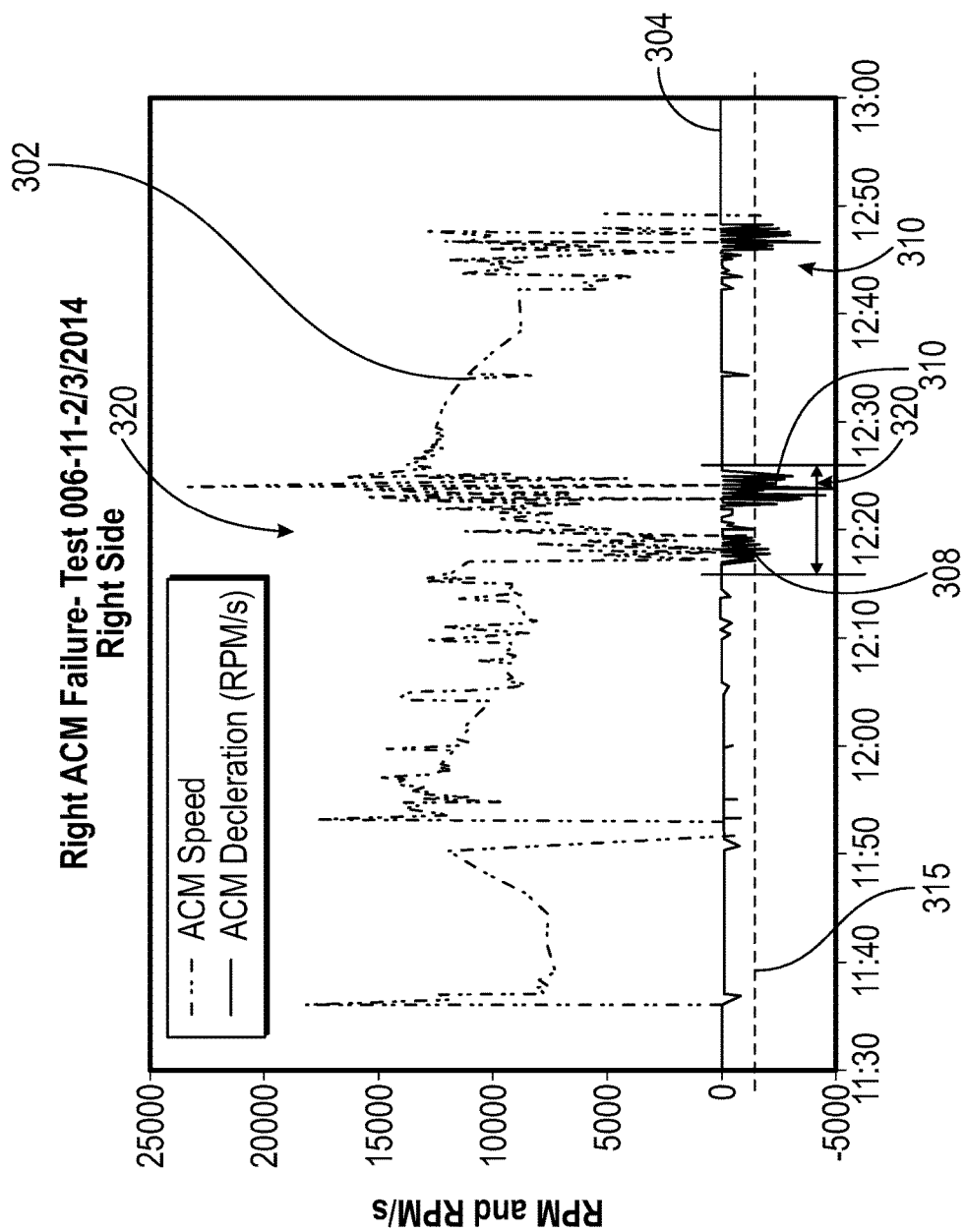
FIG. 3 shows speeds and deceleration rates of the rotational component for a failing air cycle machine.

FIG. 3 shows speeds and deceleration rates of the rotational component for a failing air cycle machine 102. The component speed is indicated by speed curve 302 (in rpm) and the rate of change of the component is indicated by acceleration curve 304 (in rpm/sec). Time is measured along the abscissa. The speed curve 302 exhibits erratic fluctuations 306 in a time period indicate by interval 320. In the same time interval 320, the acceleration curve 304 displays multiple spikes 308, 310 indicating acceleration/deceleration. The spikes 308, 310 indicate sudden deceleration of the component of the air cycle machine 102 as a result of frictional contact between components of the air cycle machine 102 due to momentary overload of the air bearing. In addition, the spikes 308, 310 are generally of greater magnitude than the spikes 206, 208 and 210 shown in FIG. 2. An impending failure of the component may be indicated by the deceleration spikes 308, 310 crossing the rate threshold. In one embodiment, the magnitude of the rate threshold may be about 1000 mm/sec. For illustrative purposes, the rate threshold is indicated by line 315. Deceleration spikes 206, 208 exceed the rate threshold (i.e., drop below line 315) several times during time interval 320.

In one embodiment, the processor (106, FIG. 1) determines a crossing count by counting a number of times the acceleration curve 304 crosses the rate threshold 315 (i.e., a "crossing") in a downward direction as shown in FIG. 3. When the crossing count exceeds a crossing count threshold, the processor 106 may shut down the air cycle machine 102. The crossing count threshold may be a preselected value. In another embodiment, the processor 106 determines the crossing count related to a selected time interval, such as time interval 320. When the crossing count for the selected time interval exceeds the crossing count threshold, the air cycle machine 102 may be shut down. The selected time interval may be a moving time interval so that a crossing is dropped from the crossing count when the time since the crossing is greater than the time duration of the time interval. For example, for a time interval of 10 minutes, the crossing count includes all of the crossings in the previous 10 minutes, but not any crossings than occurred more than 10 minutes from the present time.

Additionally, the processor (106, FIG. 1) may maintain a count of a number of times that the rate of change of the rotational speed changes its sign (i.e., a "sign change count") such as when the rate of change of the rotational speed switches from an acceleration to a deceleration or switches from deceleration to acceleration. The sign change count may be obtained over a selected interval such as time interval 320. A sign change may be dropped from the sign change count when the time since the sign change is greater than the duration of the time interval 320. The sign change count may be used along with the crossing count in order to shut down the air cycle machine 102. In one embodiment, the air cycle machine 102 may be shut down when the crossing count exceeds the crossing count threshold. Alternatively, the air cycle machine 102 may be shut down when both the crossing count exceeds the crossing count threshold and the sign change count exceeds a sign change count threshold. In the example of FIG. 3, the air cycle machine 102 may be shut down at a time of about 12:26 in order to prevent experiencing a failure of the air cycle machine 102 that otherwise occurs at about 12:48.

Figure 4:
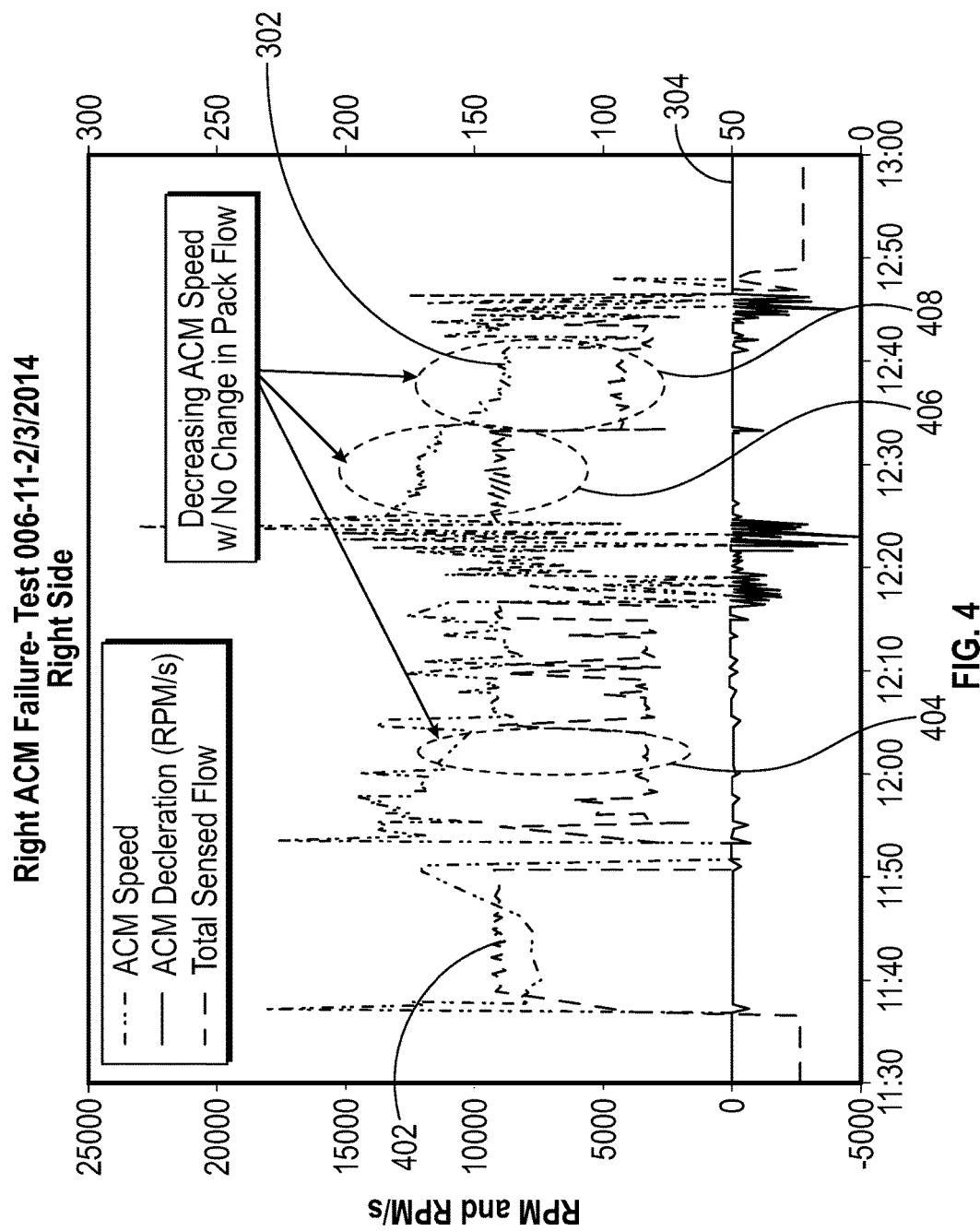
FIG. 4 shows the speed curve and acceleration curve of FIG. 3 along with a pack flow curve associated with the air cycle machine.

FIG. 4 shows the speed curve 302 and acceleration curve 304 of FIG. 3 along with a pack flow curve 402 associated with the air cycle machine 102. In one embodiment, the speed curve 302 can be compared to the pack flow 402 to determine whether the component speed changes as expected with the pack flow. For example, a faster than normal decrease in speed can be an indication of the air bearing damage. At times 404, 406 and 408, the pack flow is constant while the component speed is changing, indicating that the air cycle machine 102 is not affecting the pack flow as expected. Such comparison between pack flow 402 and speed curve 302 may be used to indicate a failing air cycle machine 102, which in turn may be used to shut down the air cycle machine 102 or at least to determine an operational state of the air cycle machine 102.

In addition to using the acceleration/deceleration curves, magnitudes and sign changes, one can also use a rate of change of the acceleration and/or deceleration to control the air cycle machine 102. The processor 106 can compare the rate of change of the acceleration/deceleration to a selected threshold and shut down or turn off the air cycle machine 102 when the rate of change of the acceleration and/or deceleration exceeds the selected threshold.

In various embodiments, the air cycle machine 102 may be shut down when the appropriate threshold or thresholds are exceeded. Alternately, a warning signal may be presented to an operator such as a pilot in order to allow the pilot to shut down the air cycle machine 102 manually. Once the air cycle machine 102 has been shut down, the pilot may be able to restart the air cycle machine 102.

While the invention has been described with respect to air cycle machines, the same bearing system and speed signatures can be seen with systems that use other gases or gas mixtures as bearing components. Such gases may include, but are not limited to, refrigerant gases such as Freon, for example.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of operating an air cycle machine, comprising:
    measuring a rotational speed of a component of the air cycle machine;
    estimating a rate of change of the rotational speed of the component;
    comparing the rate of change of the rotational speed to a selected rate threshold;
    counting a number of times the rate of change of the rotational speed exceeds the selected rate threshold to obtain a crossing count, the crossing count being obtained for a selected time interval;
    shutting down the air cycle machine in response to the crossing count for the selected time interval exceeding a crossing count threshold;
    and determining an operational state of the air cycle machine by comparing a speed of the component to a pack flow.

2. The method of claim 1, further comprising:
    counting a number of sign changes of the rate of change of the rotational speed during the selected time interval to obtain a sign change count, and
    shutting down the air cycle machine when the crossing count exceeds the crossing count threshold and the sign change count exceeds a sign change count threshold during the selected time interval.

3. The method of claim 1, wherein the rate of change of the rotational speed is a deceleration and a magnitude of the deceleration is compared to a magnitude of the selected rate threshold.

4. The method of claim 1, further comprising measuring the rotational speed of the component of the air cycle machine at a rate of 20 hertz.

5. The method of claim 1, wherein shutting down the air cycle machine further comprises at least one of (i) providing a warning signal; and (ii) automatically shutting down the air cycle machine.

6. An apparatus for operating an air cycle machine, comprising:
    a detector configured to measure a rotational speed of a component of the air cycle machine; and
    a processor configured to:
        estimate a rate of change of rotational speed of the component from the measured rotational speed, count a number of times the rate of change of the rotational speed exceeds the selected rate threshold to obtain a crossing count, the crossing count being obtained for a selected time interval;

shut down the air cycle machine in response to the crossing count of the selected time interval exceeding a crossing count threshold;

and determining an operational state of the air cycle machine by comparing a speed of the component to a pack flow.

7. The apparatus of claim 6, wherein the processor is further configured to:

count a number of sign changes of the rate of change of the rotational speed during the selected time interval to obtain a sign change count, and shut down the air cycle machine when the crossing count exceeds the crossing count threshold and the sign change count exceeds a sign change count threshold during the selected time interval.

8. The apparatus of claim 6, wherein the rate of change of the rotational speed is a deceleration and the processor is configured to compare a magnitude of the deceleration to a magnitude of the selected rate threshold.

9. The apparatus of claim 6, further comprising measuring the speed of the air cycle machine at a rate of 20 hertz.

* * * * *